United States Patent [19]

Herzing

[11] Patent Number: 4,562,079

[45] Date of Patent: Dec. 31, 1985

[54] HARD BUTTER SAVORY COATINGS

[75] Inventor: Anthony G. Herzing, Brookpark, Ohio

[73] Assignee: SCM Corporation, New York, N.Y.

[21] Appl. No.: 577,393

[22] Filed: Feb. 6, 1984

[51] Int. Cl.[4] .................................................. A21D 13/00
[52] U.S. Cl. ......................................... 426/94; 426/583; 426/607; 426/613; 426/653; 426/302; 426/307
[58] Field of Search ............... 426/589, 302, 307, 583, 426/660, 607, 606, 613, 94, 653

[56] References Cited

U.S. PATENT DOCUMENTS

| | | | |
|---|---|---|---|
| 2,168,360 | 8/1939 | Musher | 426/89 |
| 3,431,112 | 3/1969 | Durst | 426/89 |
| 3,652,299 | 3/1972 | Penton | 426/99 |
| 3,814,825 | 6/1974 | Gilmartin et al. | 426/582 |
| 3,857,977 | 12/1974 | Huessy | 426/199 |
| 3,966,993 | 6/1976 | Luck | 426/589 |
| 4,086,367 | 4/1978 | Ziccarelli | 426/583 |

*Primary Examiner*—Jeanette M. Hunter
*Attorney, Agent, or Firm*—Richard H. Thomas

[57] ABSTRACT

A savory confection-like coating which has a chewy texture and a delicate flavor of a meat, vegetable, fowl or fish food group comprising a matrix-forming amount of a hard butter, a flavoring amount of a flavor of at least one of said food groups, and an inert particulate, bland carbohydrate and/or protein base material in said hard butter.

17 Claims, No Drawings

HARD BUTTER SAVORY COATINGS

TECHNICAL FIELD

The present invention relates to savory confection-like coatings, a process for making the same, and application of the coatings to a variety of substrates such as crackers, biscuits, Melba Toast Rounds, potato chips, and extruded corn or wheat snacks.

For purposes of the present application, the terms savory coating and savory confection-like coating means coatings which have a fat matrix, are confectionery in appearance and texture, but have a non-chocolate, non-cheese, delicate flavor, or more specifically, the flavor of a food group such as meat, fish, fowl, or vegetable (e.g., tomato or pizza).

Preferably, the products of the present invention are in the form of thin coatings applied to a substrate by spraying, enrobing or pan coating. However, for purposes of the present application, the term coating includes fillings, such as between sandwiched layers, aerated fillings, and molded items.

The savory coatings of the present invention are hard at room temperature, have low microbiological activity, and are shelf stable, permitting their shipment and storage and the shipment and storage of snacks and other food items to which the coatings have been applied. The coatings readily melt in the mouth when eaten, thereby imparting desirable textural and flavor impacts to the substrates to which they are applied. By adjusting the formula for the coatings, a wide range of textural and flavor sensations may be imparted to a substrate or snack food item. By way of example, the coatings can provide a sauce-like impact, a tomato flavoring, or a drying or astringent property resembling meat or chicken.

BACKGROUND OF THE PRESENT INVENTION

Confectionery coatings prepared from hard butters have long been used in the confectionery and in the biscuit and cracker industries to coat and enhance the flavor of a variety of centers or substrates. Generally, these coatings contain a matrix of a confectionery coating fat and particulate fill ingredients comprising flavoring amounts of cocoa powder, sugar, and non-fat dry milk or whey powder. Minor amounts of other ingredients such as lecithin may also be used. Some coatings may use chocolate liquor with the cocoa powder for texture and flavor.

In the coatings of the present invention, strong flavors such as those provided by cocoa powder and sugar are deleterious, tending to mask or overwhelm, when used in more than threshold amounts, the more mild delicate flavors of such food groups as meat, fish, foul or vegetable. For purposes of the present invention, the term threshold amounts means that amount or greater to produce an ascertainable flavor of the food group intended; e.g., cocoa powder or sugar.

Currently, in the snack industry, flavors can be added to a dough prior to cooking, or by spraying with oil-containing, oil-soluble flavors, or by dusting with a flavoring powder, to obtain desired flavors in a variety of snacks. These methods all have disadvantages. Adding flavor to the dough prior to cooking requires the development of heat-stable flavors which, to date, are inferior in flavor quality. Oil spraying or spraying and dusting results in messy products which leave residue on the hands of the consumer. The present invention constitutes an improvement in providing flavor and texture in snack food items utilizing conventional confectionery processing techniques.

In prior application Ser. Nos. 402,844 and 402,845, there is disclosed the concept of replacing the cocoa powder and sugar of a confectionery coating with a cheese powder to make a cheese-flavored confectionery coating. Instead of cocoa butter, a bland hard butter is used as the matrix-forming ingredient. A characteristic of the coatings of Ser. Nos. 402,844 and 402,845 is that, in addition to having a cheese flavor, they are capable of storage under ambient conditions. A true cheese normally requires refrigeration.

The coatings of Ser. Nos. 402,844 and 402,845 may be applied to a farinaceous substrate such as crackers, croutons, bread sticks and pretzels, and also to non-farinaceous substrates such as meat centers. However, the formulations of these patent applications would not be suitable for the preparation of savory coatings. A cheese flavor, as with a chocolate flavor, is strong and distinct, and would not necessarily be compatible with the mild, more delicate flavor of a food group such as meat, fish, fowl or vegetable, at least where one of the latter flavors is intended to be stressed. The disclosures of Ser. Nos. 402,844 and 402,845 are incorporated by reference herein.

Prior U.S. Pat. No. 2,268,360, to Musher, describes a fat-containing food composition which can be added to water and cooked to make a product such as gravy. The food composition comprises essentially a hard fat and a water-absorbent bodying material such as corn starch, tapioca, gum arabic, gelatin and pectin. Spices, condiments and the like, can be intimately admixed with these ingredients. The composition is intended for addition to water or an aqueous medium to make a final product, and would not be suitable as a savory confection-like coating.

The Durst U.S. Pat. No. 3,431,112 describes a food bar and method for making the same, intended to improve on the technology of the Musher patent. In this patent, the fat particles are encapsulated with a film-former such as non-fat milk solids, sodium caseinate, soy protein and others, referred to as hydrophilic colloids. The encapsulated fat particles function as a binder for other food ingredients, described as food particles in flake, shredded, fibrous or powdered form; e.g., corn flakes, wheat flakes, rice, oats, graham cracker pieces, rice crispies, potato flakes, dried meat, vegetables, dried food particles, onion particles and others. As with the Musher et al patent, the product of this patent is designed for reconstitution with or addition to water.

U.S. Pat. No. 3,652,299 to Penton describes a concentrate product which is said to be a rigid or brittle solid at room temperature and which contains a fat, oil or hard butter, emulsifier, and starch material, such as potato starch, arrowroot starch, wheat starch or rice starch. The product of this patent also contains sauce flavoring materials desired to impart a characteristic flavor, such as milk solids, cheese, dehydrated onion chips, dehydrated mushrooms, pimiento, and others. Although principal applications for the concentrate product appear to be such foods as sauces, soups and gravies, prepared by addition to water, it is indicated in the patent that the concentrate of the patent, in a hot, viscous form, can be applied to a food item by spraying, for instance, onto dehydrate potato slices passing on a belt conveyor. On cooling, it is indicated that the concentrate forms a hard coating over the slices which then may be packaged in a suitable container. Even here, the intended ultimate application, such as escalloped or augratin potatoes, is intended to be cooked from a frozen state. There is no mention of forming a confection-like coating for consumption in the marketed state, and the concentrate product of this patent would not be suitable for the preparation of confection-like coatings.

U.S. Pat. No. 3,814,825 to Gilmartin et al describes a synthetic, chunked cheese-flavored product said to be suitable for use on salad dressings, dips, dehydrated foods and sauces. The product comprises finely comminuted cheese-flavored dry material admixed into a molten blend of hard and soft fats.

U.S. Pat. No. 3,857,977 to Huessy describes the formulation of edible food flavoring cubes or pellets for incorporation into dry food systems, wherein the cubes have a wheat flour, soy flour, and dry buttermilk base. Whey may also be present as a flavoring ingredient. The dry bulk ingredients are thoroughly mixed together and a fat phase, such as hydrogenated vegetable oil, is added. A water phase is then added and mixing is continued until homogeneous. The mix is extruded through a heated die and cut into pellets. The vegetable oil functions primarily to provide lubrication during the extrustion step.

Luck U.S. Pat. No. 3,966,993, assigned to assignee of the present application, describes a sauce or gravy bar adapted to be melted and mixed with water to produce a sauce or gravy for use. The sauce or gravy bars are prepared, in part, by mixing fat, flour and condiment solids together, tempering the mixture, forming the tempered mixture into a solid bar under conditions precluding complete remelting of the fat crystals, and cooling the bar to room temperature. Here again, the product would be unsuitable for the preparation of a confection-like coating.

DISCLOSURE OF INVENTION

The present invention resides in a savory confection-like coating which is substantially free of sugar, which has a chewy texture, which can be applied to a substrate, and which has a recognizable but delicate non-chocolate flavor of a meat, vegetable, fowl or fish food group, comprising a matrix-forming amount of a hard butter; a flavoring amount of a flavoring material of at least one of said food groups; and an inert particulate bland base material in said hard butter, said particulate base material preferably having an average particle size less than about 100 microns.

Preferably, said base is a blend of friable, bland carbohydrates and proteins, blended to provide optimum friability, blandness, and non-hygroscopicity. In a preferred embodiment, at least about 15% of said base is one or more friable, dairy-derived ingredients such as lactose or whey, and these are blended with other particulate ingredients of the base prior to particle size reduction. The presence of a minimum amount of a very friable ingredient is important to achieve the desired size reduction.

With size reduction to an average particle size less than about 100 microns, the coating is non-gritty.

Said base materials are preferably non-hygroscopic, and at least a portion of said base materials are preferably astringent, particularly for use with such flavors as meat or fish. A preferred embodiment comprises a low DE corn syrup solid, such as maltodextrin blended with the lactose and/or whey, and where astringency is required, an effective amount of a protein such as soy protein sufficient to provide an astringent sensation. Both lactose and whey have a slightly milky flavor, and the presence of a low DE corn syrup solid provides desirable blandness to the base. This ingredient also assists in making the base more non-hygroscopic. A protein such as soy protein, in addition to contributing astringency, has nutritional value.

A preferred hard butter is one having a Wiley Melting Point in the range of about 84°–120° F. and an SFI index of at least about 40° at 80° F., and less than about 35° at 92° F.

For certain applications, it may be preferred that there be present in the composition of the present invention a small amount (less than about 10%, based on the hard butter content) of a diluent lipid effective to improve hard butter appearance. Such a diluent lipid can be a lower melting fat, one either separately added or indigenous in the flavoring material or base, or a lipid emulsifying ingredient.

Processing the savory covertures of the present invention preferably is similar to processing chocolate coatings, where the particle size of the solid portions of the coating is reduced by refining to achieve a smooth mouth feel. The refining step is then followed to conching, a liquefaction process where the coating is given high shear mixing at a temperature above the melting point of the fat. Liquid coating may be stored liquid in bulk until use. Savory covertures may be molded, sprayed, coated on a single surface, or used to completely enrobe the surface of a snack. After application or molding, the snack is cooled until the coating solidifies.

An alternative to refining is to separately reduce the particle size of the base materials and then add the same to the lipid and/or flavoring ingredient(s).

Application of the coatings of the present invention to a substrate can employ a variety of procedures. Enrobing, which is the complete coating of a snack, may employ equipment in which the snack is passed through a curtain or waterfall of liquid coating. This equipment is commonly available in the confectionery and biscuit industries. Nuts and raisins may be pan-coated with the coatings of the present invention. Pan-coating is a process in which a center is tumbled in a special revolving pan while the coating material is slowly added. Also, a snack can be sprayed with the coatings of the present invention. If spraying is used, preferably the viscosity of the coating is reduced to below about 40° MacMichael to ensure an optimum spraying pattern. Also, the coatings may be molded into bars to form a bar product.

BEST MODE FOR CARRYING OUT THE INVENTION AND INDUSTRIAL APPLICABILITY

Hard Butters and Lipid Phase

In the practice of the present invention, the hard butter can be any of a large number of confectionery hard butters in the marketplace. Preferably, they have a Wiley Melting Point in the range of about 84°–120° F., as determined by AOCS method Cc2-38, and an approximate solid fat index, as determined by AOCS method Cd10-57, of

| Temperature °F. | Approx. Solid Fat Index |
|---|---|
| 80 | more than about 40 |

| Temperature °F. | Approx. Solid Fat Index |
|---|---|
| 92 | less than about 35 |

A preferred hard butter, useful in the composition of the present invention, is Kaomel (trademark SCM Corporation), having a Wiley Melting Point in the range of about 97°–101° F., an IV of about 59, and a solid-fat index as follows:

| Temperature °F. | Approx. Solid Fat Index |
|---|---|
| 50 | 69 min. |
| 70 | 59 min. |
| 80 | 52 min. |
| 92 | 22 min. |
| 100 | 5 max. |
| 110 | 0 |

This hard butter is derived from a blend of hydrogenated soybean and cottonseed oil, as defined in U.S. Pat. No. 2,972,541 by Cochrane et al, assigned to assignee of the present application.

Another suitable hard butter useful in the coating composition of the present invention is a lauric hard butter marketed by SCM Corporation under the trademark Satina AB, having a Wiley Melting Point of about 92° F. and a solid fat index of

| Temperature °F. | Approx. Solid Fat Index |
|---|---|
| 50 | 73 |
| 70 | 67 |
| 80 | 55 |
| 92 | 0 |

Hydrogenated palm kernel oil may also be used in the composition of the present invention, having a Wiley Melting Point of 95°–11° F. This fat may also be used in a blend with an edible diluting oil, as described below.

Still another suitable hard butter useful in the coating composition of the present invention is Choco-mate (trademark SCM Corporation), having a Wiley Melting Point of about 102° F. and a solid fat index of

| Temperature °F. | Approx. Solid Fat Index |
|---|---|
| 50 | 78 |
| 80 | 74 |
| 92 | 33 |
| 100 | 1 |

It may be desirable to blend a liquid diluting oil with the above hard butter, to provide better wettability of the base particles. The oil should have oxidative stability. One suitable such oil is Durkex 100 (trademark, SCM Corporation), a partially hydrogenated soybean oil having a Wiley Melting Point of about 65° F., and an AOM of 90 hours minimum. This oil may be blended with the Kaomel up to about 40%, based on total lipid content. Another suitable such oil is Durkex 500 (trademark, SCM Corporation), a partially hydrogenated vegetable oil having a WMP of 73° F. and an AOM of 350 hours minimum. The oil is a diluent and is effective in improving hard butter appearance, e.g., preventing speckling, when used in an amount up to about 10% based on hard butter content.

Another hard butter blend, useful in the practice of the present invention, is a blend of 75% Kaomel and 25% 100°–102° cottonseed oil. This blend has a Wiley Melting Point of about 99°–103° F., about 20% minimum SFI at 92° F., 51% minimum at 70° F., and 61% minimum at 50° F., and can be successfully employed with gloss-forming emulsifiers, specifically a combination of sorbitan monostearate (1.57%) and polysorbate 60 (1.05%). Such emulsifiers in combination with hard butters for obtaining gloss are well known in the confectionery art. However, other gloss-forming emulsifiers may be employed in accordance with the concepts of the present invention. An advantage of such emulsifiers is that they increase the viscosity of the coating at application temperature for better control of coverture of the substrate to which the coatings are applied.

Examples of other gloss-forming emulsifiers which also have the effect of increasing viscosity are: polyoxyalkylene derivatives of partial glycerides of higher fatty acids, other sorbitol and sorbitan esters of higher fatty acids, other polyoxyalkylene derivatives of sorbitol and sorbitan esters of higher fatty acids, polyglycerol esters of higher fatty acids, and polyoxyalkylene derivatives of polyglycerol esters of higher fatty acids. For present purposes, isomers of sorbitol (e.g., mannitol, etc.) are included too. Higher fatty acids are $C_8$ and higher fat forming acids (e.g., up to $C_{22}$–$C_{28}$ and typically are $C_{12}$–$C_{18}$ fat-forming acids. Specific lipoidal emulsifiers include, for example, sorbitan tristearate, ethoxylated monoglycerides and diglycerides, ethoxylated sorbitan esters of higher fatty acids (e.g., polysorbate 65, 80, etc.), higher fatty acids of polyglycerol (from about 3 to 10 glycerol units and preferably about 8) and their polyoxyalkylene derivatives, and the like. A very useful emulsifier blend is a combination of approximately equal amounts of Santone 8-1-0 (trademark, SCM Corporation), and octaglycerol monooleate, and Durtan 60 (trademark, SCM Corporation), sorbitan monostearate.

In the practice of the present invention, the amount of hard butter employed is a matrix forming amount. Normally, this would be in the range of about 30–40%, based on the total weight of the coating formulation. The exact amount of hard butter used depends upon the properties desired in the final coating, and properties of the hard butter used. Generally, the higher the hard butter content, the lower the viscosity of the coating during processing of the coating, such as refining and conching, and also during application to a substrate. A higher hard butter content also gives more hardness and gloss in the final product, and a smoother texture.

Use of a hard butter in a sufficient amount to form a continuous matrix and completely enrobe the base particles, provides a smooth, chewy texture, free of grittiness.

Also, to be ambient stable, the products of the present invention have a moisture content less than about 3.5%. Use of a matrix forming amount of hard butter resists moisture pickup and loss of ambient stability.

If desired, a complete wetting of the base particles by the hard butter continuous phase may be facilitated by adding to the coating formulations of the present invention an amount of viscosity-reducing lecithin. Normally, the amount of lecithin added is less than about 0.5%, based on the weight of the total coating formulation, following conventional confectionery formulation techniques.

Inert Particulate Base

The base of the present invention is comprised of inert particles capable of being non-gritty in the lipid phase, either rendered so by conventional confectionery refining techniques, or by separate particle size reduction of the base ingredients and adding the ground particulates to the lipid phase. For this purpose, a principal requirement of the base is that it be friable, having a friability factor approximately equivalent to that of sugar. Attrition of the base particles can be carried out in a number of ways, for instance, in a hammer mill, a ball mill, or a roll mill. It also may be desirble, for optimum control of properties of the finished product, that the base particles be substantially free of fat which would function as a diluent of the lipid phase. The base particles preferably are bland in taste, to avoid masking or adversely affecting the food group flavors which are added. The particles are preferably non-hygroscopic, equivalent in this regard, as well, to sugar, to avoid water pickup prior to processing. Water can adversely affect processing during refining, and/or conching, causing undesired agglomeration, as is well known in confectionery practice. A portion of the particles of the base are preferably astringent in nature, as indicated above, to add to the flavor a complementing sensation of astringency. This is particularly important in the case of meat, fowl and fish flavors.

Those particles which are bland in taste and at the same time have a high degree of friability and non-hygroscopicity approximating that of sugar, are disaccharides, such as lactose or whey. Whey is very high in lactose content. The whey can be demineralized whey or sweet dairy whey. Sweet dairy whey has a slight saltiness, which may be advantageous or disadvantageous, depending upon the coating dominant flavor. Preferably, at least about 15% of the base is lactose or whey, or a blend of the same. With a minimum of at least this amount of a very friable ingredient, it was found that the entire blend of base ingredients could be reduced in size to an average particle size of the desired less than about 100 microns, as long as the reduction was carried out on the blend and not individual ingredients.

Friable, dairy derived food additives such as non-fat dry milk are well known ingredients in confectionery formulations. Non-fat dry milk solids and non-fat buttermilk solids, however, may, for many delicate flavors, have too much flavor. However, it is within the scope of the present invention that the base can include small amounts of these ingredients.

A preferred protein ingredient is one that is bland in flavor, such as defatted soy protein. A friable protein such as a caseinate can also be used. The protein provides nutrition and also a desired astringency, as indicated above.

Both lactose and whey have a slight milky flavor, and soy protein has a slight beany flavor, so that a desirable ingredient of the base, to dilute the flavors of other base ingredients, is a bland, hydrolyzed, non-hygroscopic, friable starch, such as a low DE corn syrup solid having a dextrose equivalent less than about 15, e.g., maltodextrin.

Proportions of the base ingredients can be widely varied. Again, at least 15% is a bland, dairy-derived, friable carbohydrate such as lactose, whey, or a blend thereof. On a parts basis, the composition preferably comprises approximately 15–40 parts carbohydrate, (either lactose, whey or a blend thereof); approximately 0–30 parts maltodextrin or other bland, low DE hydrolyzed starch (for flavor dilution); and approximately 0–30 parts of defatted soy protein or other friable, bland, non-hygroscopic protein having a high protein content (for nutrition and astringency).

The base should be free of threshold amounts of sugar, cocoa and, preferably, also, cheese, unless a mild cheese sensation is desired to complement the dominant food flavor sought. In such case, the cheese particles would be included in the base in small amounts, using in part the technology of copending patent application Ser. Nos. 402,844 and 402,845. If used, the cheese particles preferably are low in fat or butterfat content, or fat-free.

In the practice of the present invention, the amount of lipid phase, or hard butter, is a matrix-forming amount, broadly about 25–50% by weight of the total composition, preferably about 30–40%, although following known technoloy this is dependent on the base and flavoring ingredients and their particle sizes. The amount of flavoring material (and also colorants) is a effective amount (to flavor and color), usually less than about 15%. The balance is essentially particulate base.

EXAMPLES

The coatings of the present invention can be formulated into a variety of flavors, for instance a tomato flavor or pizza flavor, a chicken or meat flavor, or fish flavor, all being relatively delicate or mild, as compared to cheese and chocolate flavors. The following examples are illustrative of the present invention.

EXAMPLE I

| TOMATO FLAVOR FORMULA | |
|---|---|
| Ingredients | Weight Percentage |
| Kaomel hard butter (trademark, SCM Corp.) | 36 |
| Durkex 500 oil (trademark, SCM Corp) | 4 |
| Lecithin | 0.4 |
| Inert particulate base | 48.5 |
| Tomato flavor (oil soluble) | .3 |
| Tomato seasoning blend | 10.0 |
| Red color #40 Lake | .4 |
| Yellow color #6 Lake | .4 |

In the above formulation, the composition of the particulate base was as follows:

| Ingredients | Percent | Broad Range % |
|---|---|---|
| Soy Soy protein S-640 (trademark, Grain Processing) | 10 | 5–15 |
| Demineralized whey, Meloblend 899 (trademark, Dairyland | 35 | 30–40 |
| Lactose (Land O'Lakes) | 30 | 25–35 |
| Maltodextrin M-050 (trademark, Grain Processing) | 25 | 20–30 |

The above formulation was prepared by blending the dry ingredients with the molten hard butter and other lipids, and forming a paste. The paste was then ground to an average particle size of less than about 100 micrometers through the use of a conventional confectionery refining 3-roll mill. The refined paste was then liquified by mixing it overnight in a Hobart mixer equipped with a waterbath set at about 140° F. After mixing, the lecithin in the formula was added, further reducing the viscosity. The coating was then reduced in temperature to 105° F. and applied to a variety of snacks. On application, the coating gave a pleasing tomato flavor. The coating had a chewy texture.

EXAMPLE II

The following formulation was prepared:

| CHICKEN FLAVOR FORMULA | |
| --- | --- |
| Ingredient | Percentage |
| Kaomel hard butter | 40 |
| Durtan 60 sorbitan monostearate (trademark, SCM Corp) | .4 |
| Santone 8-1-0, octaglycerol monooleate (trademark, SCM Corp) | .4 |
| Lecithin | .4 |
| Particulate base | 51.4 |
| Roast chicken flavor | 2. |
| Chicken seasoning blend | 5. |
| Yellow color #5 Lake | .4 |

The particulate base employed in the above formulation was as follows:

| Ingredient | Approx. wght. Percentage | Broad range wght. percentage |
| --- | --- | --- |
| Soy protein S-640 (trademark, Grain Processing) | 20 | 15-25 |
| Demineralized whey, Meloblend 899 (Dairyland) | 30 | 25-35 |
| Lactose (Land O'Lakes) | 30 | 25-35 |
| Maltodextrin M-050 (Grain Processing) | 20 | 15-25 |

The savory coating was processed as in Example I, and when applied to a substrate gave a pleasing chicken taste. In this Example, the soy protein content was slightly increased to give a more astringent sensation compatible with the chicken flavor.

EXAMPLE III

Pizza Flavored Formulation

The following ingredients were blended together as in Example I:

| Ingredients | Weight Percentage |
| --- | --- |
| Kaomel hard butter | 36. |
| Durkex 500 oil | 4. |
| Lecithin | .4 |
| Particulate base | 57. |
| Liquid tomato flavoring | .3 |
| Pizza seasoning blend | 1.5 |
| Red color #40 Lake | .4 |
| Yellow color #6 Lake | .4 |

The particulate base of Example I was employed in this formulation. When applied to a substrate, the coating formulation provided a distinct, pleasing pizza flavor and a chewy texture.

It is apparent that other flavorings than those given, as well as spices, condiments, nuts, dried food ingredients and the like, can be added to the coating formulations of the present invention to obtain complementing taste, texture and flavor senstations. Some examples are bacon bits, crouton pieces, puffed grains, cereals, fried chip pieces, fried vegetable pieces, fruit pieces and parsley flakes.

I claim:

1. A hard non-chocolate savory coating which has the appearance and texture of a confectionery coating, a chewy texture, which can be applied to a substrate, and which has a recognizable but delicate flavor of a meat, vegetable, fish or fowl food group, or combination of such food groups, comprising
   (a) about 25-50%, based on total composition weight, of a hard butter having a Wiley Melting Point in the range of about 84°-120° F.;
   (b) a flavoring amount of a flavoring material selected from the group consisting of meat flavor, vegetable flavor, fish flavor, fowl flavor, and combinations thereof;
   (c) an inert particulate, bland base in said hard butter selected from the group consisting of protein, carbohydrate, and combinations thereof, at least about 15% of said base being lactose, whey or a blend thereof;
   said hard butter, flavoring material and base being milled or refined and conched, in the absence of water, in order to reduce base particle size and completely wet the base particles with hard butter to thereby produce said confectionery coating texture.
2. The coating of claim 1 wherein said base has an average particle size less than about 100 microns.
3. The coating of claim 2 wherein said carbohydrate is selected from the group consisting of lactose, whey, or a blend of the same.
4. The coating of claims 1 or 2 wherein said base comprises a low DE hydrolyzed starch in an amount effective to reduce the flavor impact of the other base ingredients.
5. The coating of claim 4 wherein said base comprises a blend of ingredients which are non-hygroscopic, said coating having a water content of less than about 4%.
6. The coating of claim 1 wherein said hard butter has an approximate solid fat index, as determined by AOCS method Cd10-57, of more than about 40 at 80° F. and less than about 35 at 92° F.
7. The coating of claim 6 further including a diluent oil, up to about 10% based on the weight of the hard butter, said oil having a Wiley Melting Point of less than about 80° F.
8. The coating of claim 6 further including an organic emulsifier.
9. A hard non-chocolate savory coating which has the appearance and texture of a confectionery coating, a chewy texture, which can be applied to a substrate and which has a recognizable but delicate flavor of a meat, vegetable, fish or fowl food group, or combination of such food groups, comprising
   (a) about 25-50%, based on total composition weight, of a hard butter having a Wiley Melting Point in the range of about 84°-120° F.;
   (b) a flavoring amount of a flavoring material selected from the group consisting of meat flavor, fish flavor, fowl flavor vegetable flavor, and combinations thereof;
   (c) an inert particulate bland base in said hard butter having an average particle size less than about 100 microns, said base comprising;
      (1) about 15-40 parts dairy-derived carbohydrate selected from the group consisting of lactose, whey, or a blend thereof;
      (2) a flavor diluting amount, up to about 30 parts, of a hydrolyzed starch having a Dextrose Equivalence less than about 15, effective to dilute the flavor of other base ingredients;

(3) about 0-30 parts defatted, friable, bland, non-hydroscopic protein capable of providing astringency, said hard butter, base and flavoring material being milled or refined and conched, in the absence of water, in order to reduce base particle size and completely wet the base particles with hard butter to thereby produce said confectionery texture.

10. The coating of claim 9 comprising approximately equal amounts of lactose and whey in said base.

11. The coating of claim 10 which is shelf-stable.

12. The coating of claim 10 having a water content less than about 4%.

13. The coating of claim 10 in sandwich, coating, extruded or molded form.

14. The coating of claim 10 which is aerated.

15. A food product obtained by the step of applying the coating of claim 10 to a substrate by either spraying, enrobing, pan coating or molding.

16. A food product comprising a substrate and the coating of claim 11, 14 or 16.

17. A hard non-chocolate savory coating which has the appearance and texture of a confectionery coating, a chewy texture, which can be applied to a substrate, and which has a recognizable but delicate flavor of a meat, vegetable, fish or fowl food group, or combination of such food groups, comprising (a) about 25-50%, based on total composition weight, of a hard butter having a Wiley Melting Point in the range of about 84°-120° F.;

(b) a flavoring amount of a flavoring material selected from the group consisting of meat flavor, vegetable flavor, fish flavor, fowl flavor, and combinations thereof;

(c) an inert particulate, bland base in said hard butter comprising about 15-40 parts bland, friable carbohydrate, about 0-30 parts low DE hydrolyzed starch, and about 0-30 parts bland, friable, non-hygroscopic protein;

said hard butter, flavoring material and base being milled or refined and conched, in the absence of water, in order to reduce base particle size and completely wet the base particles with hard butter to thereby produce said confectionery coating texture.

* * * * *